(12) United States Patent
Bolle et al.

(10) Patent No.: US 7,054,470 B2
(45) Date of Patent: May 30, 2006

(54) SYSTEM AND METHOD FOR DISTORTION CHARACTERIZATION IN FINGERPRINT AND PALM-PRINT IMAGE SEQUENCES AND USING THIS DISTORTION AS A BEHAVIORAL BIOMETRICS

(75) Inventors: Rudolf Maarten Bolle, Bedford Hills, NY (US); Chitra Dorai, Chappaqua, NY (US); Nalini K. Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/653,804

(22) Filed: Sep. 3, 2003

(65) Prior Publication Data

US 2004/0042642 A1 Mar. 4, 2004

Related U.S. Application Data

(63) Continuation of application No. 09/537,077, filed on Mar. 28, 2000, now abandoned.

(60) Provisional application No. 60/168,540, filed on Dec. 2, 1999.

(51) Int. Cl.
*G06K 9/00* (2006.01)

(52) U.S. Cl. ...................... 382/124; 713/186
(58) Field of Classification Search ............. 382/120, 382/122, 125, 173, 190, 191, 199, 201, 276, 382/124–127, 115, 116, 166; 356/71; 345/173; 713/186
See application file for complete search history.

(56) References Cited

U.S. PATENT DOCUMENTS 5,933,515 A 8/1999 Pu et al. .................... 382/124
6,323,846 B1 11/2001 Westerman et al. ......... 345/173
6,388,657 B1 5/2002 Natoli ........................ 345/168

(Continued)

OTHER PUBLICATIONS

Bergen et al., "Hierarchical Model-Based Motion Estimation," pp. 237, 251 (May 1992).

(Continued)

*Primary Examiner*—Samir Ahmed

(57) ABSTRACT

This invention uses a novel biometrics, called resultant fingerprints and palm-prints, for authentication. The novel biometrics are consecutive traditional print images where the subject physically changes the appearance of the print images by rotating or rotating and translating, or rotating, translating, and shearing the finger or palm. That is, it is a sequence of finger or palm-print images over a short interval of time where the images are modified according to the rotation or a combination of rotation and translation or a combination of rotation, translation, and shear. The rotational and translational and shear components of the motion in the sequence of print images are determined from the image-to-image flow. This flow is either computed from motion-compensation vectors of the sequence compressed in MPEG formats or directly from the uncompressed images. The global image-to-image flow is expressed in terms of an affine transformation, computed from the local flow in blocks around a non-moving central region. The rotational and translational components of this affine transformation are smoothed over a temporal neighborhood resulting in a function of time. This function of time is a behavioral biometrics which can be changed by the user when compromised. Matching of this function for authentication purposes is achieved very much as is done in legacy signature matching authentication systems where two temporal signals are compared.

14 Claims, 14 Drawing Sheets

U.S. PATENT DOCUMENTS

| | | | |
|---|---|---|---|
| 6,466,686 B1 | 10/2002 | Senior | 382/124 |
| 6,487,306 B1 | 11/2002 | Jain et al. | 382/125 |
| 2003/0028784 A1* | 2/2003 | Ushida | 713/186 |
| 2003/0123714 A1* | 7/2003 | O'Gorman et al. | 382/124 |
| 2003/0126448 A1* | 7/2003 | Russo | 713/186 |

OTHER PUBLICATIONS

Dorai et al., "Extracting Motion Annotations from MPEG-2 Compressed Video for HDTV Content Management Applications," International Conference on Multimedia Computing and Systems, Jun. 7-11, 1999, Florence Italy, IEEE Multimedia Systems '99, vol. 1, pp. 673-678 (1999).

Haskell et al., "Digital Video: An Introduction to MPEG-2," Motion Compensation Modes in MPEG, Chapter 7, pp. 146-155 (1997).

Nalwa, V.S., "Automatic On-Line Signature Verification," Proceedings of the IEEE, vol. 85, No. 2, pp. 215-239 (Feb. 1997).

Ratha et al., "Adaptive Flow Orientation-Based Feature Extraction in Fingerprint Images," Pattern Recognition, vol. 28, No. 11, pp. 1657-1672 (1995).

Ratha et al., "A Real-Time Matching System for Large Fingerprint Database," IEEE Transactions on Pattern Analysis and Machine Intelligence, vol. 18, No. 8, pp. 799-813 (1996).

* cited by examiner

AFFINE TRANSFORMATION

SYSTEM AND METHOD FOR DISTORTION CHARACTERIZATION IN FINGERPRINT AND PALM-PRINT IMAGE SEQUENCES AND USING THIS DISTORTION AS A BEHAVIORAL BIOMETRICS

CROSS REFERENCE TO RELATED APPLICATIONS

The application is a continuation of U.S. patent application Ser. No. 09/537,077, filed on Mar. 28, 2000 now abandoned, which claims priority from Provisional Application Ser. No. 60/168,540, was filed on Dec. 2, 1999.

FIELD OF THE INVENTION

This invention relates to the field of biometrics, i.e., physical or behavioral characteristics of a subject that more or less uniquely relate to the subject's identity. This invention relates to a new type of biometrics which is produced by a subject as a sequence of fingerprint or palm-print images distorted through a series of controlled changes to the traditional biometrics, by the motion of the finger or palm over the print reader.

BACKGROUND OF THE INVENTION

Fingerprints have been used for identifying persons in a semiautomatic fashion for at least fifty years for law enforcement purposes and have been used for several decades in automatic authentication applications for access control. Signature recognition for authenticating a person's identity has been used at least for fifteen years, mainly for banking applications. In an automatic fingerprint or signature identification system, the first stage is the signal acquisition stage where a subject's fingerprint or signature is sensed. There are several techniques to acquire a fingerprint including scanning an inked fingerprint and inkless methods using optical, capacitative or other semiconductor-based sensing mechanisms. The acquired biometric signal is processed and matched against a stored template. The image processing techniques typically locate ridges and valleys in the fingerprint and derive the templates from the ridge and valley pattern of a fingerprint image.

Signatures, on the other hand, are typically sensed through the use of pressure sensitive writing pads or with electromagnetic writing recording devices. More advanced systems use special pens that compute the pen's velocity and acceleration. The recorded signal can be simply a list of (x, y) coordinates, in the case of static signature recognition, or can be a function of time (x(t), y(t)) for dynamic signature recognition. The template representing a signature is more directly related to the acquired signal than a fingerprint template is. An example is a representation of a signature in terms of a set of strokes between extremes, where for each stroke the acceleration is encoded. For examples of signature authentication, see V. S. Nalwa, "Automatic on-line signature verification," Proceedings of IEEE, pp. 215–239, February 1997. This reference is incorporated herein by reference in its entirety.

Recently, biometrics, such as fingerprints, signature, face, and voice are being used increasingly for authenticating a user's identity, for example, for access to medical dossiers, ATM access, access to Internet services and other such applications.

With the rapid growth of the Internet, many new e-commerce and e-business applications are being developed and deployed. For example, retail purchasing and travel reservations over the Web using a credit card are very common commercial applications. Today, users are recognized with a userID and password, for identification and authentication, respectively. Very soon, more secure and more convenient methods for authentication and possibly identification involving biometrics, such as fingerprints, signatures, voice prints, iris images and face images will be replacing these simple methods of identification. An automated biometrics system involves acquisition of a signal from the user that more or less uniquely identifies the user. For example, for fingerprint-based authentication a user's fingerprint needs to be scanned and some representation needs to be computed and stored. Authentication is then achieved by comparing the representation extracted from the user's fingerprint image acquired at the time of logon with a stored representation extracted from an image acquired at the time of enrollment. In a speaker verification system a user's speech signal is recorded and some representations is computed and stored. Authentication is then achieved by comparing the representation extracted from a speech signal recorded at logon time with the stored representation. Similarly, for signature verification, a template is extracted from the digitized signature and compared to previously computed templates.

Biometrics are distinguished into two broad groups: behavioral and physiological biometrics. Physiological biometrics, are the ones that are relatively constant over time, such as, fingerprint and iris. Behavioral biometrics, on the other hand, are subject to possibly gradual change over time and/or more abrupt changes in short periods of time. Examples of these biometrics are signature, voice and face. (Face is often regarded to be a physiological biometrics since the basic features cannot be changed that easily; however, haircuts, beard growth and facial expressions do change the global appearance of a face). The field of the present invention relates to physiological and behavioral biometrics. More particularly, this invention relates to creating resultant fingerprint and resultant palm-print biometrics by adding a series of user-controlled changes to physiological or behavioral biometrics and measuring the behavioral component. The representation of such a resultant print is a template of the static print plus a representation of the user-induced changes.

One of the main advantages of Internet-based business solutions is that they are accessible from remote, unattended locations including users' homes. Hence, the biometrics signal has to be acquired from a remote user in a unsupervised manner. That is, a fingerprint or a palm-print reader, a signature digitizer or a camera for acquiring face or iris images is attached to the user's home computer. This, of course, opens up the possibility of fraudulent unauthorized system access attempts. Maliciously intended individuals or organizations may obtain biometrics signals from genuine users by intercepting them from the network or obtaining the signals from other applications where the user uses her/his biometrics. The recorded signals can then be reused for unknown, fraudulent purposes such as to impersonate a genuine, registered user of an Internet service. The simplest method is that a signal is acquired once and reused several times. Perturbations can be added to this previously acquired signal to generate a biometrics signal that may be perceived at the authentication side as a "fresh" live signal. If the complete fingerprint or palm print is known to the perpetrator, a more sophisticated method would be to fabricate from, for example, materials like silicone or latex, an artificial ("spoof") three-dimensional copy of the finger or palm. Finger- and palm-print images of genuine users can then be produced by impostors without much effort. A transaction server, an authentication server or some other computing device would then have the burden of ensuring that the biometric signal transmitted from a client is a current and live signal, and not a previously acquired or otherwise constructed or obtained signal. Using such artificial body parts, many fingerprint and palm-print readers produce images that look very authentic to a lay person when the right material is used to fabricate these body parts. The images will, in many cases, also appear real to the component image processing parts of the authentication systems. Hence, it is very difficult to determine whether the static fingerprint or palm-print images are produced by a real finger or palm or by spoof copies.

PROBLEMS WITH THE PRIOR ART

Fingerprints and, to a lesser extent, palm prints are used more and more for authenticating a user's identity for access to medical dossiers, ATM access, and other such applications. A problem with this prior art method of identification is that it is possible to fabricate three-dimensional spoof fingerprints or palm prints. Silicone, latex, urethane or other materials can be used to fabricate these artificial body parts and many image acquisition devices simply produce a realistic looking impression of the ridges on the artificial body parts which is hard to distinguish from a real impression. A contributing factor is that a fingerprint or palm-print impression obtained is the static depiction of the print at some given instant in time. The fingerprint in not a function of time. A problem here is that static two-dimensional or three-dimensional (electronic) spoof copies of the biometrics can be fabricated and used to spoof biometric security systems since these biometrics are not functions of time.

Another problem with the prior art is that only one static fingerprint or palm-print image is grabbed during acquisition of the biometrics signal. This instant image may be a distorted depiction of the ridges and valley structure on the finger or palm because the user exerts force, torque and/or pressure with the finger with respect to the image acquisition device (fingerprint or palm-print reader). A problem is that, without grabbing more than one image or modifying the mechanics of the sensor, it cannot be detected whether the image is acquired without distortion. An additional problem with the prior art of grabbing a static fingerprint image and representing a static fingerprint image is that there is only one choice for the image that can be used for person authentication and that image may not be the best depiction of the ridge-valley structure.

The following reference is incorporated by reference in its entirety:

Allen Pu and Demetri Psaltis, User identification through sequential input of fingerprints, U.S. Pat. No. 5,933,515, August 1999.

The method presented by Pu and Psaltis in their patent U.S. Pat. No. 5,933,515 uses multiple fingers in a sequence which the user remembers and known to the user only. If the fingers are indexed, say, from left to right as finger 0 through finger 9, the sequence is nothing more than a PIN. If one would consider the sequence plus the fingerprint images as a single biometric, the sequence is a changeable and non-static part of the biometric, it is not a dynamic part, because it is not relating to physical force or energy. A problem is that anyone can watch the fingerprint sequence, probably easier than observing PIN entry because fingerprint entry is a slower process. Moreover, it requires storing each of the fingerprint template of the subject for comparison.

Another problem with the prior art is that in order to assure authenticity of the biometrics signal, the sensor (fingerprint or palm-print reader) needs to have embedded computational resources finger/palm authentication and sensor authentication. Body part authentication is commonly achieved by pulse and body temperature measurement. Sensor authentication is achieved with two-directional challenge-response communication between the sensor and the authentication server.

A potential big problem with prior art palm- and fingerprints is that if the user somehow loses a fingerprint or palm print impression or the template representing the print and this ends up in the wrong hands, the print is compromised forever since one cannot change prints. Prints of other fingers can then be used but that can only be done a few times.

A problem with prior art systems that use static fingerprints is that there is no additional information associated with the fingerprint which can be used for its additional discriminating. That is, individuals that have fingerprints that are close in appearance can be confused because the fingerprints are static.

Traditional fingerprint databases may be searched by first filtering on fingerprint type (loop, whorl, . . . ). A problem with this prior art is that there are few fingerprint classes because the fingerprint images are static snapshots in time and no additional information is associated with the fingerprints.

A final problem with any of the prior art biometrics is that they are not backward compatible with other biometrics. For example, the use of, say, faces for authentication is not backward compatible with fingerprint databases.

OBJECTS OF THE INVENTION

An object of the invention is a method for detection of distortion in a fingerprint or palm-print image sequence where the subject moved the finger/palm during acquisition of the sequence.

Another object of the invention is a method for characterizing distortion in a fingerprint or palm-print image sequence where the subject moved the finger/palm during acquisition.

Another object of the invention is a method for determining undistorted fingerprint or palm-print images from within the sequence of print images.

A further object of the invention is a system and method for expressing the rotation of the finger from the distortion of a sequence of fingerprint images.

A further object of the invention is a system and method for expressing the rotation of the palm from the distortion of a sequence of palm-print images.

A further object of the invention is a system and method for expressing the translation of the palm from the distortion of a sequence of palm-print images.

An object of this invention is a resultant fingerprint, a combination of a traditional fingerprint biometric with user-selected behavioral changes in the form of rotating the finger. When the resultant fingerprint is compromised, the user can simply select a new behavioral, dynamic rotational part.

An object of this invention is a resultant palm-print, a combination of a traditional palm-print biometric with user-selected behavioral changes in the form of rotating the palm.

When the resultant palm-print is compromised, the user can simply select a new behavioral, dynamic rotational part.

SUMMARY OF THE INVENTION

The present invention achieves these and other objectives by extracting the motion (including rotational) component from a sequence of distorted finger or palm-print images acquired in a time-continuous fashion. The sequence of print images is a resultant fingerprint or palm-print sequence, a more or less unique characteristic associated with a person. A more compact resultant print is a representation of the print plus a representation of the motion (rotation) as a function of time.

There exist physiological and behavioral biometrics. Physiological biometrics are personal characteristics that do not change, or change very little, over time while behavioral biometrics are characteristics which may change over time, and may change abruptly. These behavioral biometrics include user-selected biometrics, like a person's signature. For the resultant fingerprint and palm-print, the fingerprint or palm-print are physiological biometrics, the user-selected change, the motion component of the distortion is a behavioral biometric. In a preferred embodiment, a subject produces a sequence of fingerprint or palm-print images by rotating the finger or palm around the vertical axis which modifies the appearance of the print images using a physical (behavioral) element. The rotation of the finger is reconstructed from the sequences of the distorted print images, an undistorted print image is selected from the sequence at a point where the rotation is zero.

BRIEF DESCRIPTION OF THE DRAWINGS

FIG. 3 shows various components for combining two biometrics at the system level, where FIG. 3B is combining through ADDing and FIG. 3D is sequential combining.

DETAILED DESCRIPTION OF THE INVENTION

This invention introduces a new method to process a new biometric called resultant biometrics. A resultant biometrics is a sequence of consecutive physiological or behavioral biometrics signals recorded at some sample rate producing the first biometrics signal plus a second biometrics, the behavioral biometrics, which is the way the physiological or behavioral biometrics is transformed over some time interval. This transformation is the result of a series of user-controlled changes to the first biometric.

Figure 1:
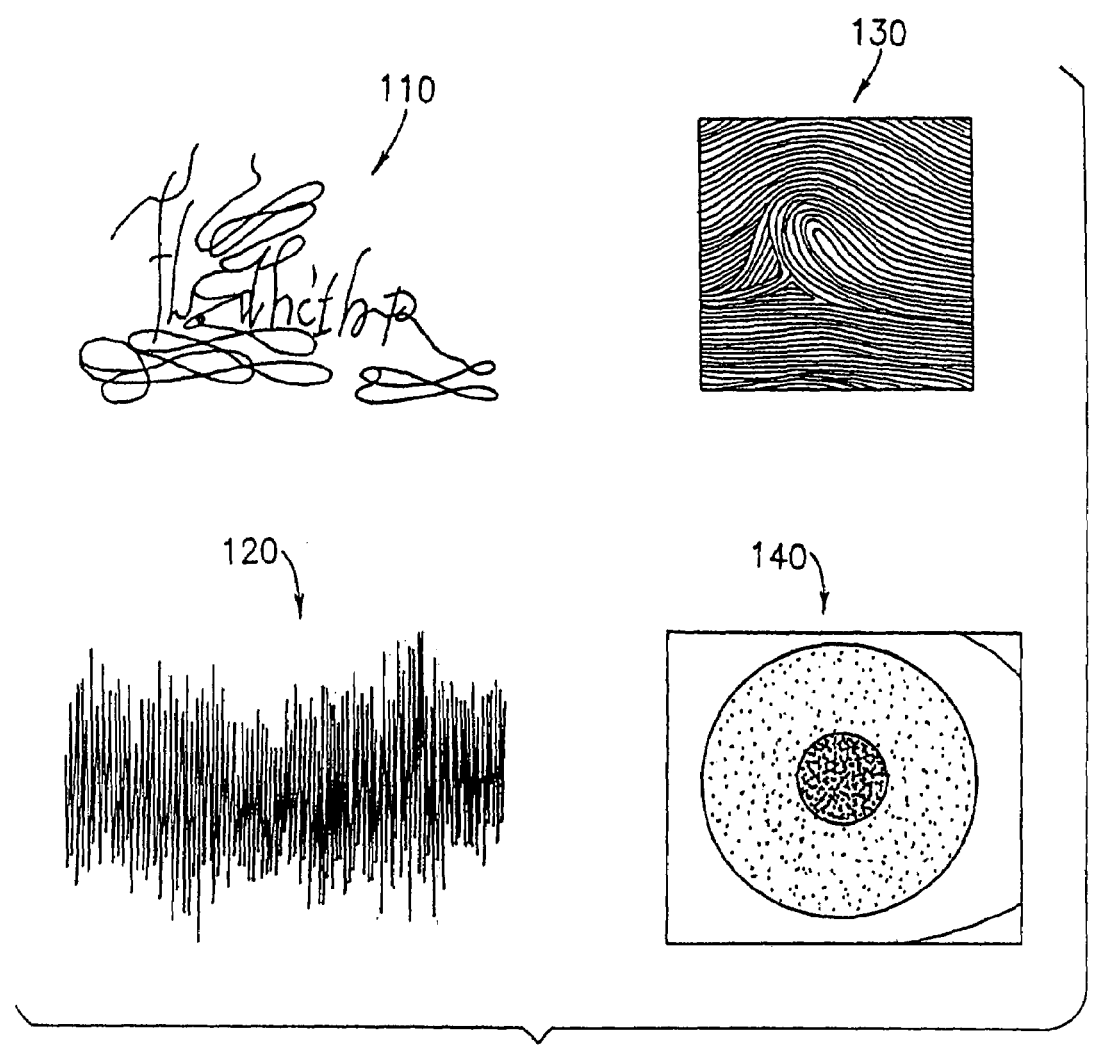
FIG. 1 gives prior art examples of biometrics.

Traditional biometrics, such as fingerprints, have been used for (automatic) authentication and identification purposes for several decades. Signatures have been accepted as a legally binding proof of identity and automated signature authentication/verification methods have been available for at least 20 years. FIG. 1 gives examples of these biometrics. On the top-left, a signature 110 is shown and on the top-right a fingerprint impression 130 is shown.

Biometrics can be used for automatic authentication or identification of a subject. Typically, the subject is enrolled by offering a sample biometric when opening, say, a bank account or subscribing to an Internet service. From this sample biometrics, a template is derived that is stored and used for matching purposes at the time the user wishes to access the account or service. In the present preferred embodiment, a template for a resultant biometric is a combination of a traditional template of the biometrics and a template describing the changing appearance of the biometric over time.

Resultant fingerprints and palm prints are described in further detail. A finger- or palm print template is derived from a selected impression in the sequence where there is no force, torque or rolling exerted. The template of the trajectory is a quantitative description of this motion trajectory over the period of time of the resultant fingerprint. Matching of two templates, in turn, is a combination of traditional matching of fingerprint templates plus resultant string matching of the trajectories similar to signature matching. Resultant fingerprints sensed while the user only exerts torque are described in greater detail.

A biometric more or less uniquely determines a person's identity, that is, given a biometric signal, the signal is either associated with one unique person or narrows down significantly the list of people with whom this biometric is associated. Fingerprints are an excellent biometrics, since never in history two people with the same fingerprints have been found; on the other hand, biometrics signals such as shoe size and weight are poor biometrics signals since these signals have little discriminatory value. Biometrics can be divided up into behavioral biometrics and physiological biometrics. Behavioral biometrics depend on a person's physical and mental state and are subject to change, possibly rapid change, over time. Behavioral biometrics include signatures 110 and voice prints 120 (see FIG. 1). Physiological biometrics, on the other hand, are subject to much less variability. For a fingerprint, the basic flow structure of ridges and valleys, see the fingerprint 130 in FIG. 1, is essentially unchanged over a person's life span. As an example of another biometrics, the circular texture of a subject's iris, 140 in FIG. 1, is believed to be even less variable over a subject's life span. Hence, there exist behavioral biometrics, e.g., 110 and 120, which to a certain extent are under the control of the subjects and there exist physiological biometrics whose appearance cannot be influenced (the iris 140) or can be influenced very little (the fingerprint 130). The signature and voice print on the left are behavioral biometrics; the fingerprint and iris image on the right are physiological biometrics.

Figure 2A:
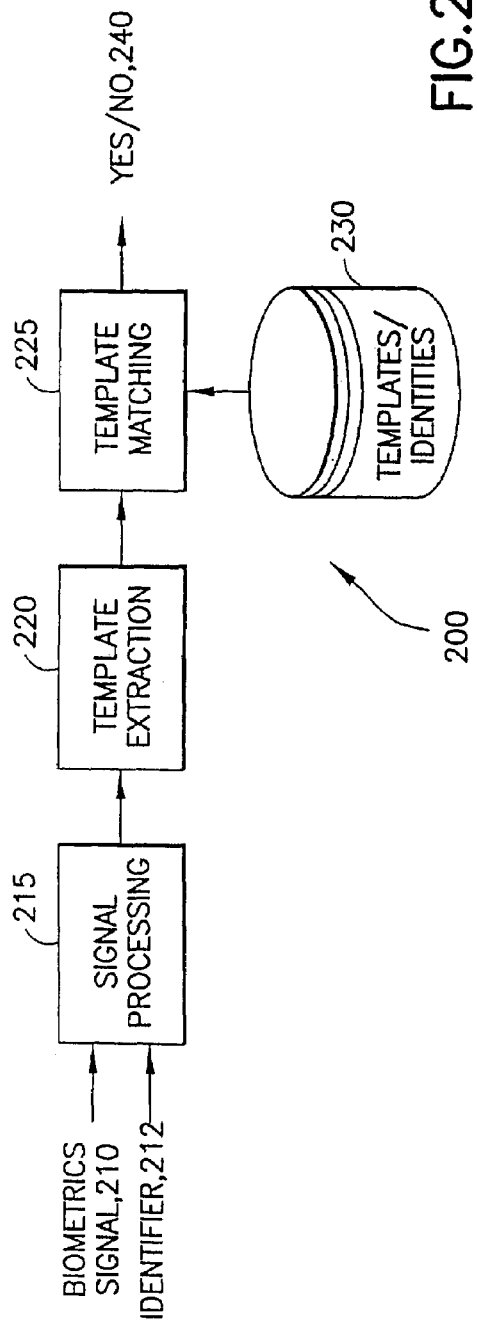
FIG. 2 shows a block diagram of an automated biometrics system for authentication (FIG. 2A) and a block diagram of an automated biometrics system for identification (FIG. 2B).

Referring now to FIG. 2A. A typical, legacy automatic fingerprint authentication system has a fingerprint image (biometrics signal) as input 210 to the biometrics matching system. This system consists of three other stages 215, 220 and 225, comprising: signal processing 215 for feature extraction, template extraction 220 from the features and template matching 225. Along with the biometrics signal 210, an identifier 212 of the subject is an input to the matching system. During the template matching stage 225, the template associated with this particular identifier is retrieved from some database of templates 230 indexed by identities. If there is a Match/No Match between the extracted template 220 and the retrieved template from database 230, a 'Yes/No' 240 answer is the output of the matching system. Matching is typically based on a similarity measure, if the measure is significantly large, the answer is 'Yes,' otherwise the answer is 'No.' The following reference describes examples of the state of the prior art:

N. K. Ratha, S. Chen and A. K. Jain, Adaptive flow orientation based feature extraction in fingerprint images, Pattern Recognition, vol. 28, no. 11, pp. 1657–1672, November 1995. This reference is incorporated herein by reference in its entirety.

Note that system 200 is not limited to fingerprint authentication, this system architecture is valid for any biometric. The biometric signal 210 that is input to the system can be acquired either local to the application on the client or remotely with the matching application running on some server. Hence architecture 200 applies to all biometrics and networked or non-networked applications.

Figure 2B:
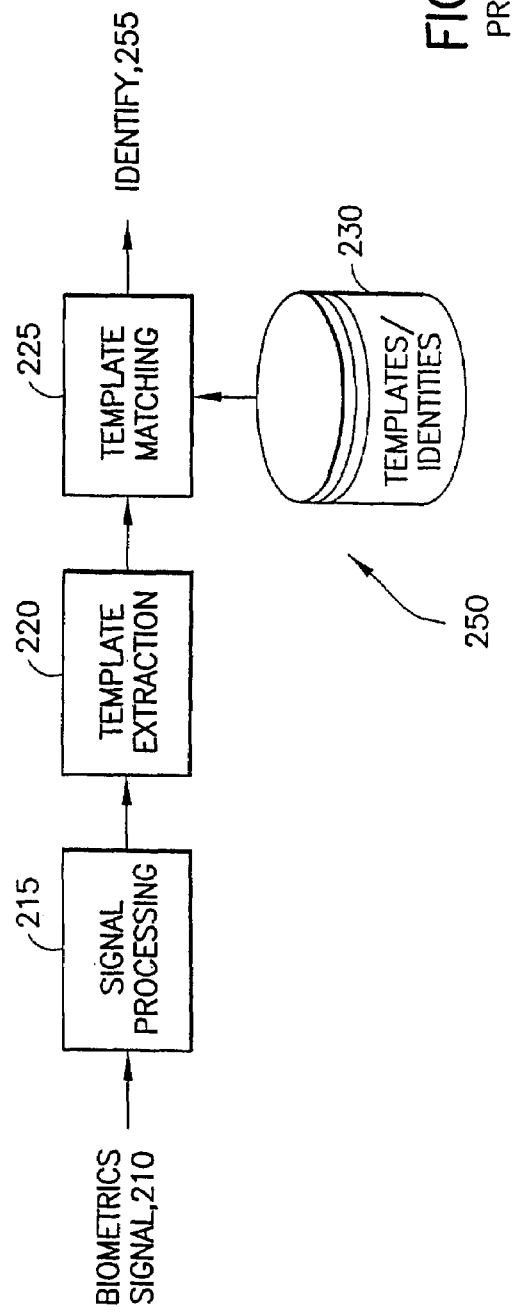

System 200 in FIG. 2A is an authentication system, system 250 in FIG. 2B is an identification system. A typical, legacy automatic biometrics signal identification system takes only a biometric signal 210 as input (FIG. 2A). Again, the system consists of three other stages 215, 220 and 225, comprising: signal processing 215 for feature extraction, template extraction 220 from the features and template matching 225. However, in the case of an identification system 250, only a biometric signal 210 is input to the system. During the template matching stage 225, the extracted template is matched to all template, identifier pairs stored in database 230. If there exists a match between the extracted template 220 and a template associated with an identity in database 230, this identity is the output 255 of the identification system 250. If no match can be found in database 230, the output identity 255 could be set to NIL. Again, the biometric signal 210 can be acquired either local to the application on the client or remotely with the matching application running on some server. Hence architecture 250 applies to networked or non-networked applications.

Figure 3B:
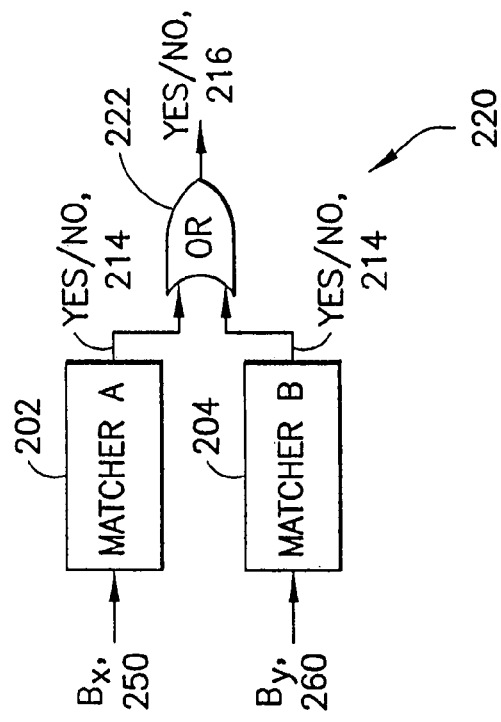
FIG. 3B is combining through ORing component.
Figure 3A:
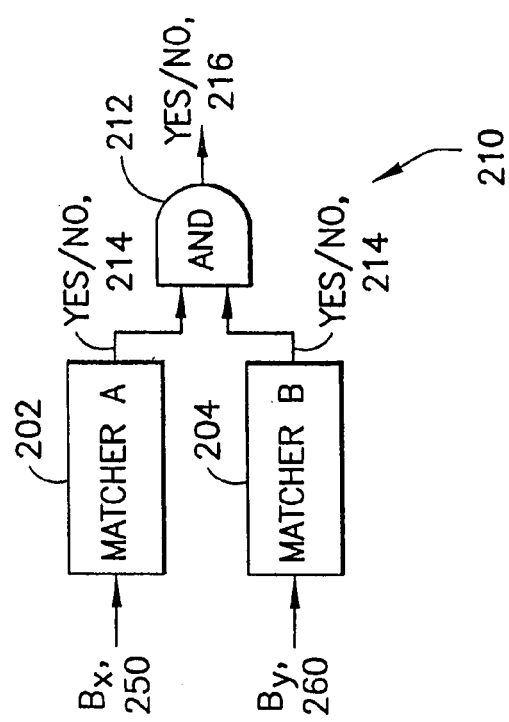
FIG. 3A is combining through ANDing component.
Figure 3D:
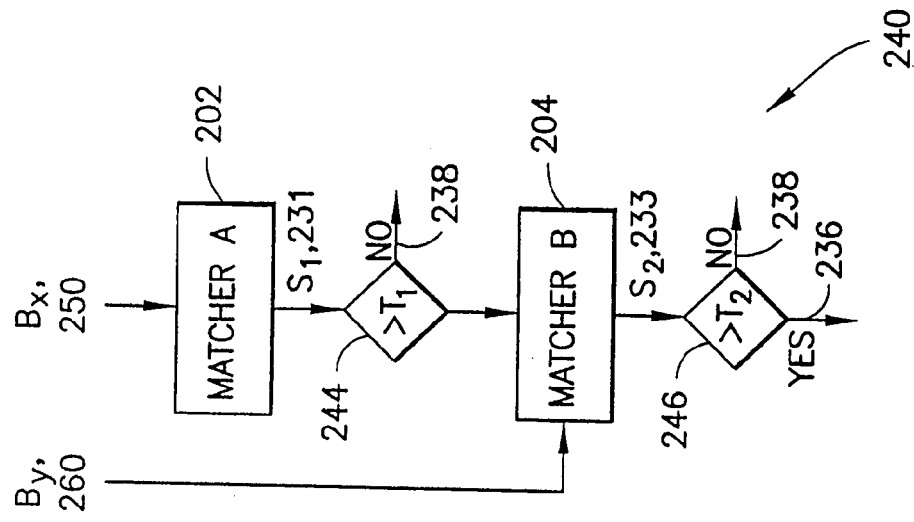
Figure 3C:
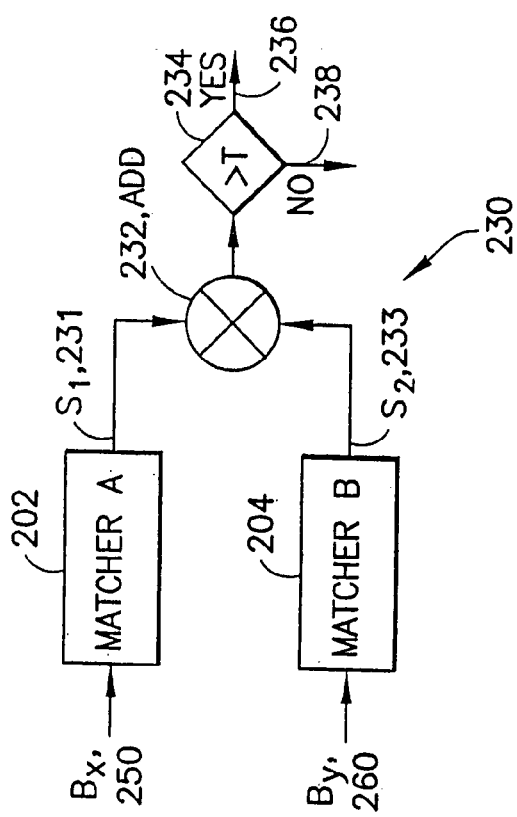

Biometric signals can be combined (integrated) at the system level and at the subject level. The latter is the object of this invention. The former is summarized in FIG. 3 for the purposes of comparing the different methods and for designing decision methods for integrated subject-level biometrics (resultant biometrics). Four possibilities for combining (integrating) two biometrics are shown: Combining through ANDing 210 (FIG. 3A), Combining through ORing 220 (FIG. 3B), Combining through ADDing 230 (FIG. 3C), and serial or sequential combining 240 (FIG. 3D). Two biometrics $B_x$ (250) and $B_y$ (260) of a subject Z are used for authentication as shown in FIG. 3. However, more than two biometrics of a subject can be combined in a straightforward fashion. These biometrics can be the same, e.g., two fingerprints, or they can be different biometrics, e.g., fingerprint and signature. The corresponding matchers for the biometrics $B_x$ and $B_y$, are matcher A 202 and matcher B 204 in FIG. 3, respectively. These matchers compare the template of the input biometrics 250 and 260 with stored templates and either give a 'Yes/No' 214 answer as in systems 210 and 220 or score values, $S_1$ (231) and $S_2$ (233), as in systems 230 and 240.

System 210, combining through ANDing, takes the two 'Yes/No' answers of matcher A 202 and matcher B 204 and combines the result through the AND gate 212. Hence, only if both matchers 202 and 204 agree, the 'Yes/No' output 216 of system 210 is 'Yes' (the biometrics both match and subject Z is authenticated) otherwise the output 216 is 'No' (one or both of the biometrics do not match and subject Z is rejected). System 220, combining through ORing, takes the two 'Yes/No' answers of matchers A 202 and B 204 and combines the result through the OR gate 222. Hence, if one of the matchers' 202 and 204 'Yes/No' output 216 is 'Yes,' the 'Yes/No' output 216 of system 220 is 'Yes' (one or both of the biometrics match and subject Z is authenticated). Only if both 'Yes/No' outputs 214 of the matchers 202 and 204 are 'No,' the 'Yes/No' output 216 of system 220 is 'No' (both biometrics do not match and subject Z is rejected).

For system 230, combining through ADDing, matcher A 202 and matcher B 204 produce matching scores $S_1$ (231) and $S_2$ (233), respectively. Score $S_1$ expresses how similar the template extracted from biometrics $B_x$ (250) is to the template stored in matcher A 202, while score $S_2$ expresses how similar the template extracted from biometrics $B_y$ (260) is to the template stored in matcher B 204. The ADDer 232 gives as output the sum of the scores 231 and 233, $S_1 + S_2$. In 234, this sum is compared to a decision threshold T, if $S_1 + S_2 > T$ 236, the output is 'Yes' and the subject Z with biometrics $B_x$ and $B_y$ is authenticated, otherwise the output is 'No' and the subject is rejected.

System 240 in FIG. 3 combines the biometrics $B_x$ (250) and $B_y$ (260) of a subject Z sequentially. First biometrics $B_x$ (250) is matched against the template stored in matcher A (202) resulting in matching score $S_1$ (231). The resulting matching score is compared to threshold $T_1$ 244, and when test 244 fails and the output 238 is 'No' the subject Z is rejected. Otherwise biometrics $B_y$ (260) is matched against the template stored in matcher B (204). The output score $S_2$ (233) of this matcher is compared to threshold $T_2$ 246. If the output is 'Yes,' i.e., $S_2 > T_2$ (236) subject Z is authenticated. Otherwise, when the output is 'No' 238, subject Z is rejected.

Figure 4:
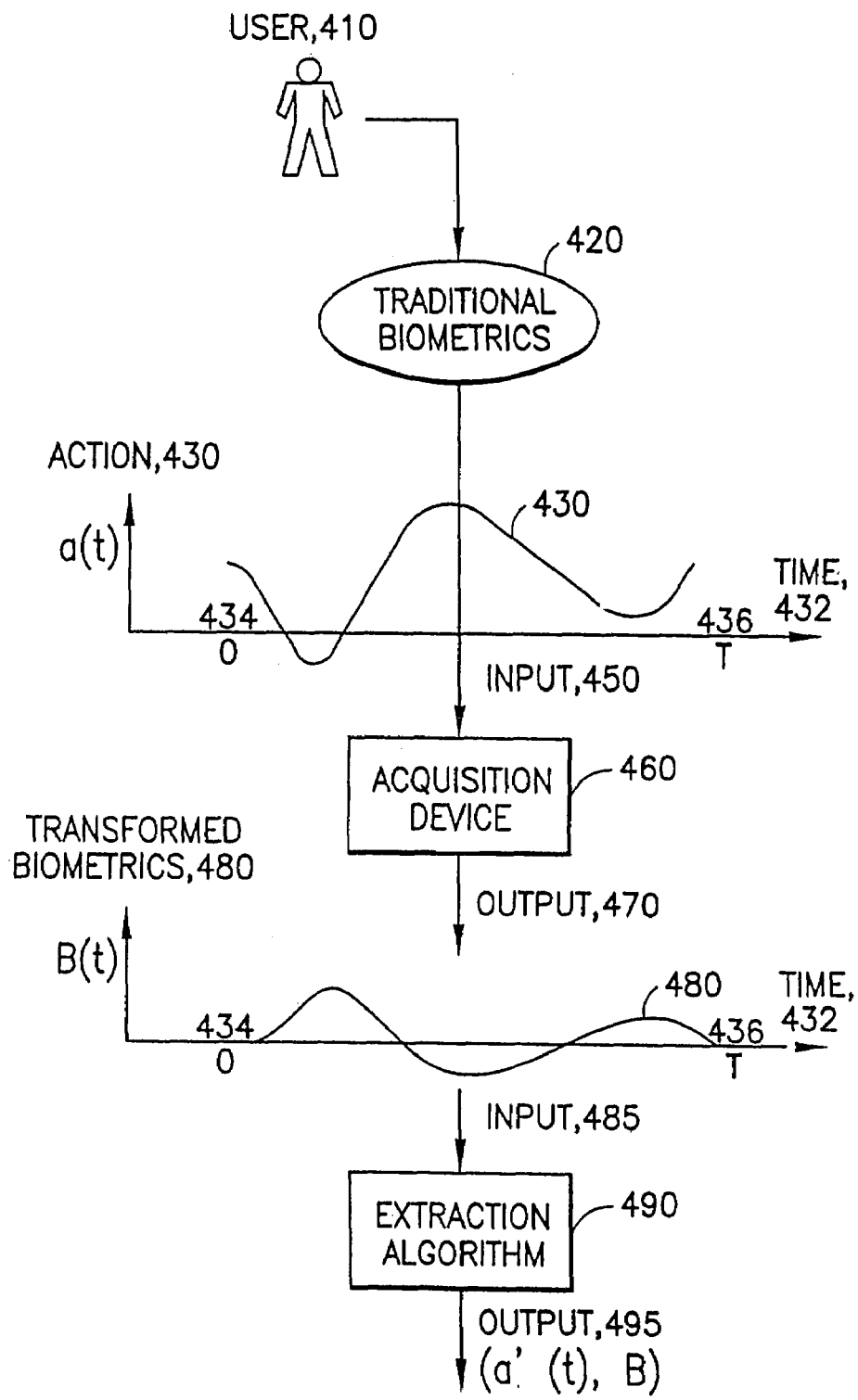
FIG. 4 is a generic block diagram conceptually showing the combining one biometrics with user action (another biometric) to obtain a resultant biometric.

FIG. 4 is a generic block diagram for combining a biometrics with user action, i.e., combining biometrics at the subject level. The user action, just like the movement of a pen to produce a signature, is the second behavioral biometrics. The user 410 offers a traditional biometric 420 for authentication or identification purposes. Such a biometrics could be a fingerprint, iris or face. However, rather than holding the biometrics still, as in the case of fingerprints or faces, or keeping the eyes open, as in case of iris recognition, the user performs some specific action 430, a(t) with the biometrics. This action is performed over time 432, from time 0 (434) to some time T (436). Hence, the action a(t) is some one-dimensional function of time 430 and acts upon the traditional biometric 420. Note that this biometric is the actual biometric of user 410 and not a biometrics signal (i.e., in the case of fingerprints, it is the three-dimensional finger with the print on it). It is specified what the constraints of the action 430 are but within these constraints, the user 410 can define the action. (For example, constraints for putting a signature are that the user can move the pen over the paper in the x- and y-direction but cannot move the pen in the z-direction.) That is, the action 430 in some sense transforms the biometric of the user over time. It is this transformed biometric 450 that is input to the biometric signal recording device 460. The output 470 of this device is a sequence of individually transformed biometrics signals B(t) 480 from time 0 (434) to some time T (436). In the case of fingerprints, these are fingerprint images, in the case of face, these are face images. This output sequence 470, is the input 485 to some extraction algorithm 490. The extraction algorithm computes from the sequence of transformed biometrics the pair (a'(t), B), 495, which is itself a biometric. The function a '(t) is some behavioral way of transforming biometric B over a time interval [0, T]and is related to the function a(t) which is chosen by the user (very much like a user would select a signature). The biometrics B can be computed from the pair (a'(t), B), that is, where a(t) 430 is zero, where there is no action of the user, the output 470 is undistorted copy of biometrics 420. In general, it can be computed where in the signal 480, the biometrics 420 is not distorted.

Figure 5:
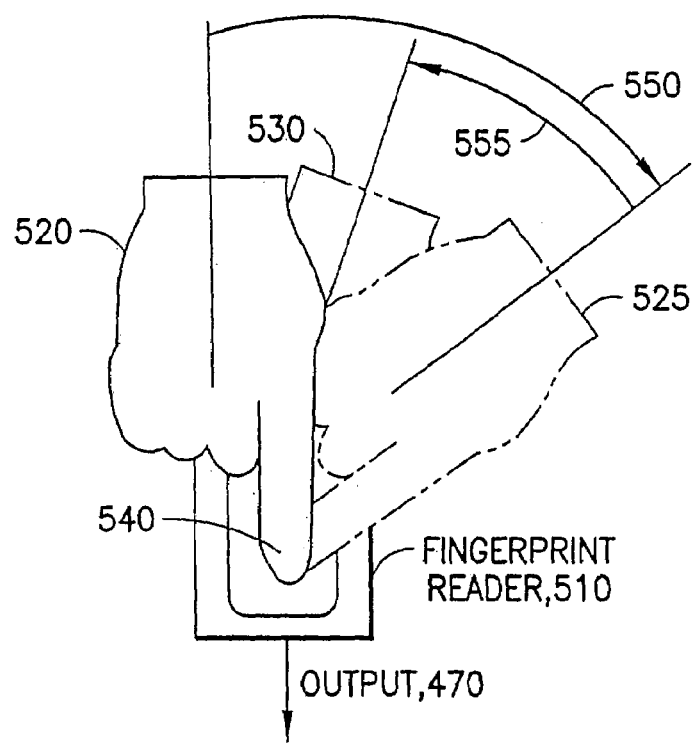
FIG. 5 is an example of a resultant fingerprint biometrics where the user can rotate the finger on the scanner according to a user-defined pattern.
Figure 5:
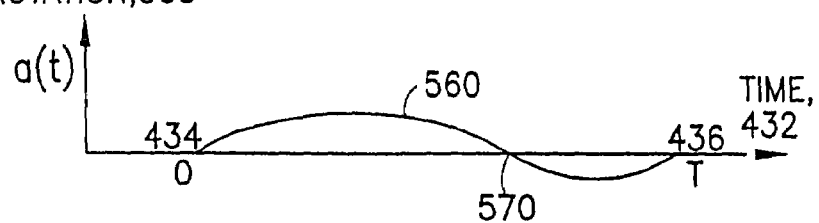

Refer to FIG. 5. This figure is an example of a resultant fingerprint biometric where the user can rotate the finger on the fingerprint reader 510 (without sliding over the glass platen). This rotation can be performed according to some user defined angle a as a function of time a(t). An example of producing a resultant fingerprint is given in FIG. 5. The user puts the finger 540 on the fingerprint reader 510 in hand position 520. Then from time 0 (434) to time T (436), the user rotates finger 540 over the glass platen of fingerprint reader 510 according to some angle a as a function of time a(t). The rotation takes place in the horizontal plane, the plane parallel to the glass platen of the fingerprint reader. The rotation function in this case is the behavioral part of the resultant fingerprint and is defined by the user. (If this portion of the resultant biometric is compromised, the user can redefine this behavioral part of the resultant fingerprint.) First the user rotates by angle 550 to the left, to the hand position 525. Then the user rotates by angle 555 to the right, resulting in final hand position 530. During this operation over time interval [0, T], the fingerprint reader has as output 470 a sequence of transformed (distorted) fingerprint images. This output 470 is a sequence of transformed biometrics 480 (fingerprints), as in FIG. 4, which are the input to the extraction algorithm 490 (FIG. 4). This algorithm computes, given the output 470, the angle a as a function of time a(t) 560 over the time interval 0 (434) to time T (436). The resultant fingerprint in this case is (a(t), F), with F the undistorted fingerprint image. The undistorted fingerprint image is found at times 434, 570 and 436 where the rotation angle a is zero. A method for extracting the rotation angles from the distorted fingerprint images is described in FIGS. 9–11.

Figure 6:
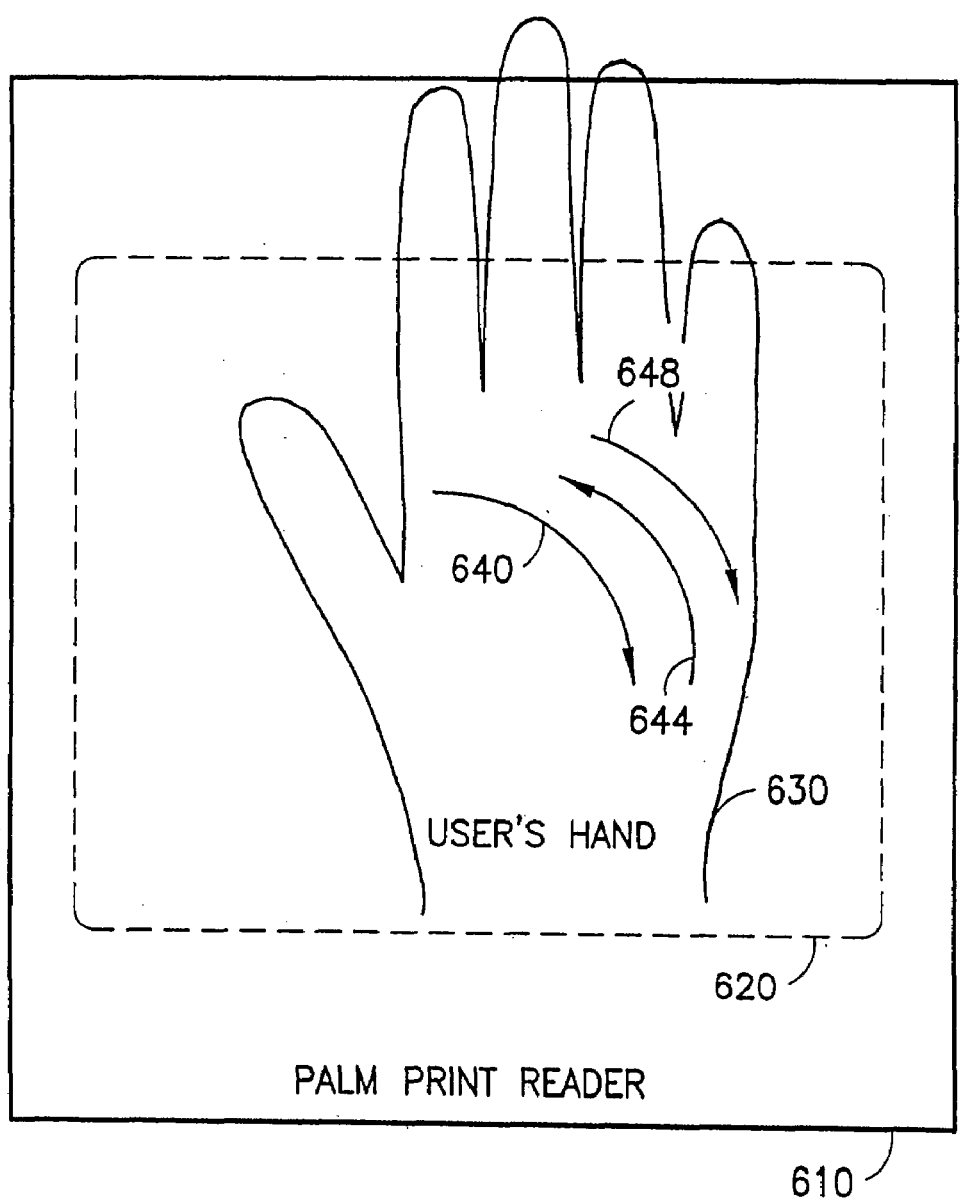
FIG. 6 is an example of a resultant palm-print biometrics where the user can rotate the palm on the scanner according to a user-defined pattern.

FIG. 6 gives an example of the same principle as fingerprints for palm prints. The palm print reader 610 with glass platen 620 can, for example, be mounted next to a door. Only authorized users with matching palm print templates will be allowed to access. The user will put his/her hand 630 on the palm print reader platen 620. As with the resultant fingerprints of FIG. 5, the user will not keep the palm biometrics still but rather rotate the palm. In the case of FIG. 6, rotation of the palm around the axis perpendicular to the glass platen is the behavioral part of the resultant palm-print biometric. The user could, for instance, rotate the hand to the right 640, followed by a rotation of the hand to the left 644, followed by a rotation of the hand to the right 648 again. As in FIG. 5, during these operations over some time interval [0, T], the palm print reader has as output a sequence of transformed (distorted) palm print images. This output is a sequence of transformed biometrics 480 (palm prints), as in FIG. 4, which are the input to an extraction algorithm 490 as in FIG. 4. The algorithm computes, given the output of palm print reader 610, the palm rotation angle a as a function of time a(t) 560 over the time interval 0 (434) to time T (436). The resultant palm print in this case will be (a(t), P), with P the undistorted palm print image. The undistorted palm print image is found at times 434, 570 and 436 where the rotation angle a is zero.

Figure 7:
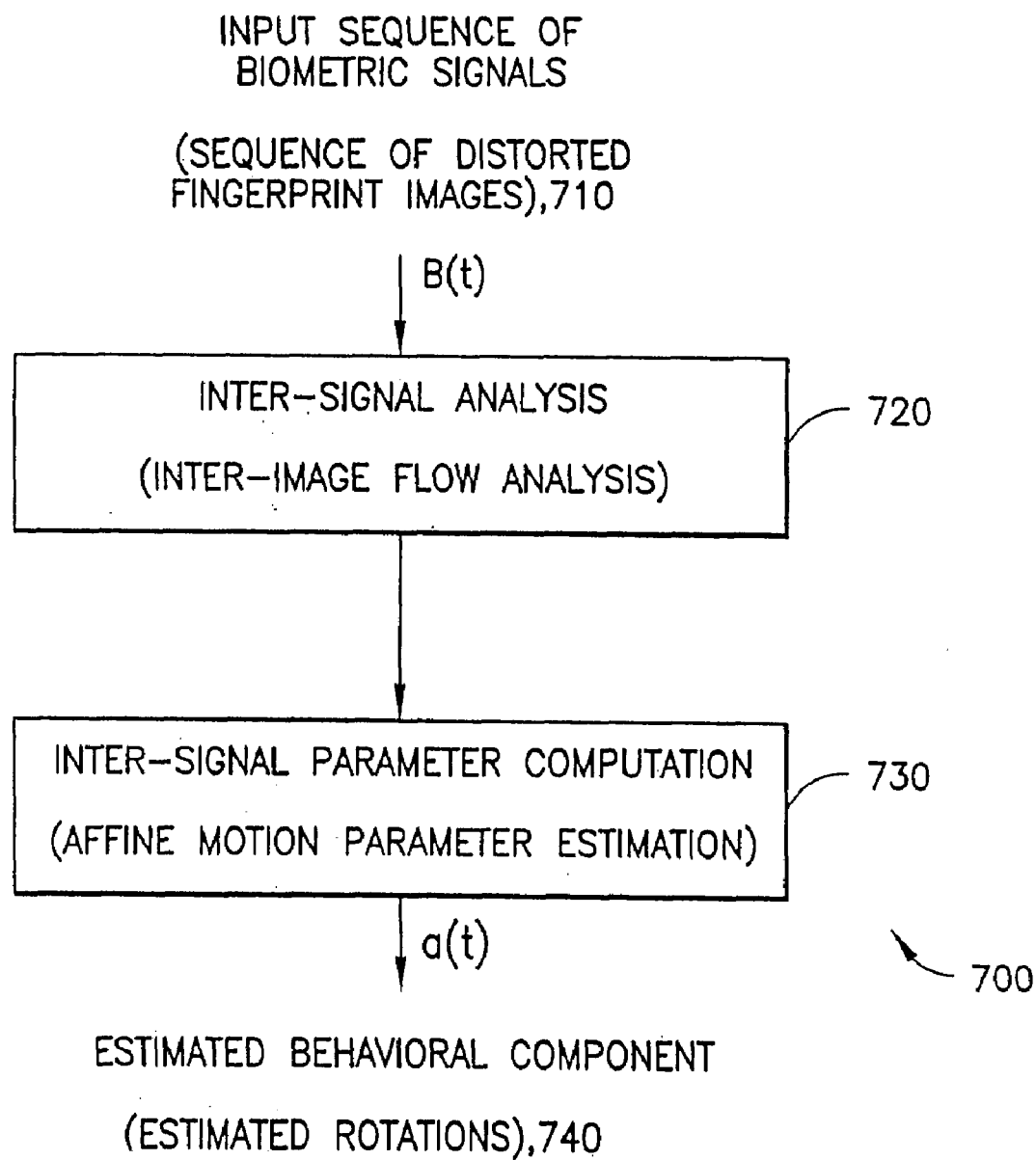
FIG. 7 shows a block diagram of the behavioral component determination of a resultant fingerprint as in FIG. 5 or resultant palm-print as in FIG. 6.

In FIG. 7, a block diagram 700 of a generic process for extracting the behavioral component from a resultant fingerprint or palm-print is given. The input 710 is a sequence of print images B(t). In block 720, two subsequent biometric images, B(t+1) and B(t), are processed through inter-signal analysis. Block 730, uses this analysis to extract the change, a(t+1)−a(t), in the rotational component. In turn, this gives the output a(t) as a function of time 740, where a(t) is the rotation of the resultant finger or palm-print B(t). Added in FIG. 9 are the specific steps for estimating the finger rotation from a sequence of distorted fingerprint images produced as in FIG. 5 or for estimating the palm rotation from a sequence of distorted palm-print images produced as in FIG. 6. Step 720 amounts to inter-image flow analysis, determining the motion of the image pattern from image to image for each block. Step 730 amounts to determining the overall motion of all the image blocks in the form of an affine transformation, a transformation specified by transformation, rotation and shear. These are further explained in FIGS. 8–11.

Figure 8:
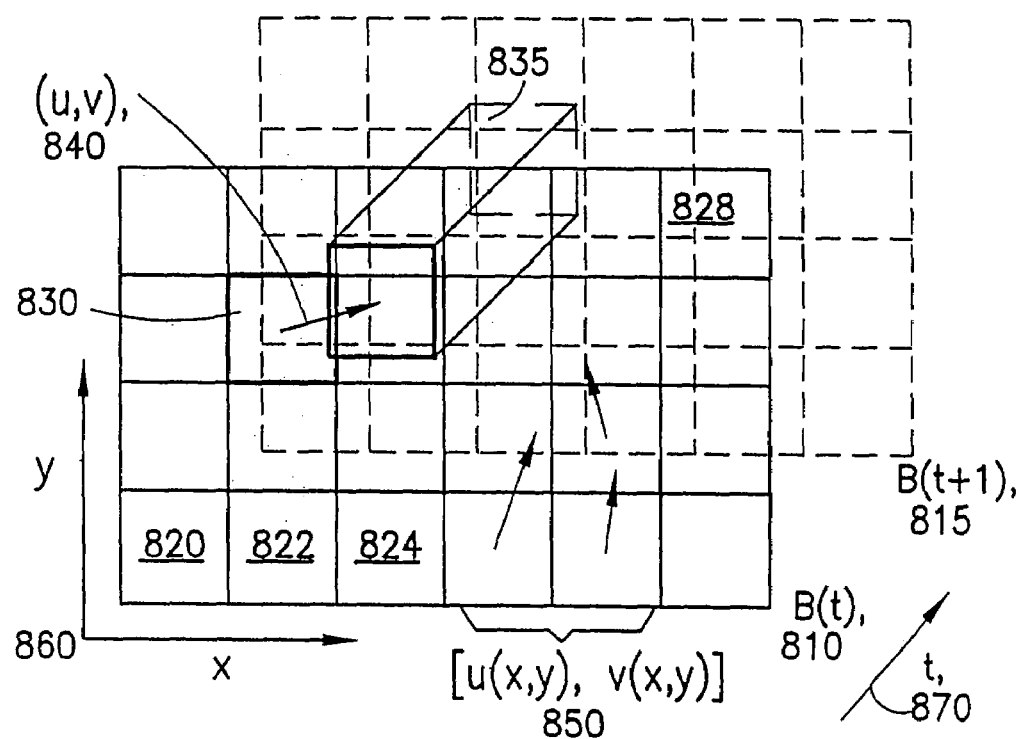
FIG. 8 shows the local flow computation on a block by block basis from the input resultant fingerprint image sequence.
Figure 9:
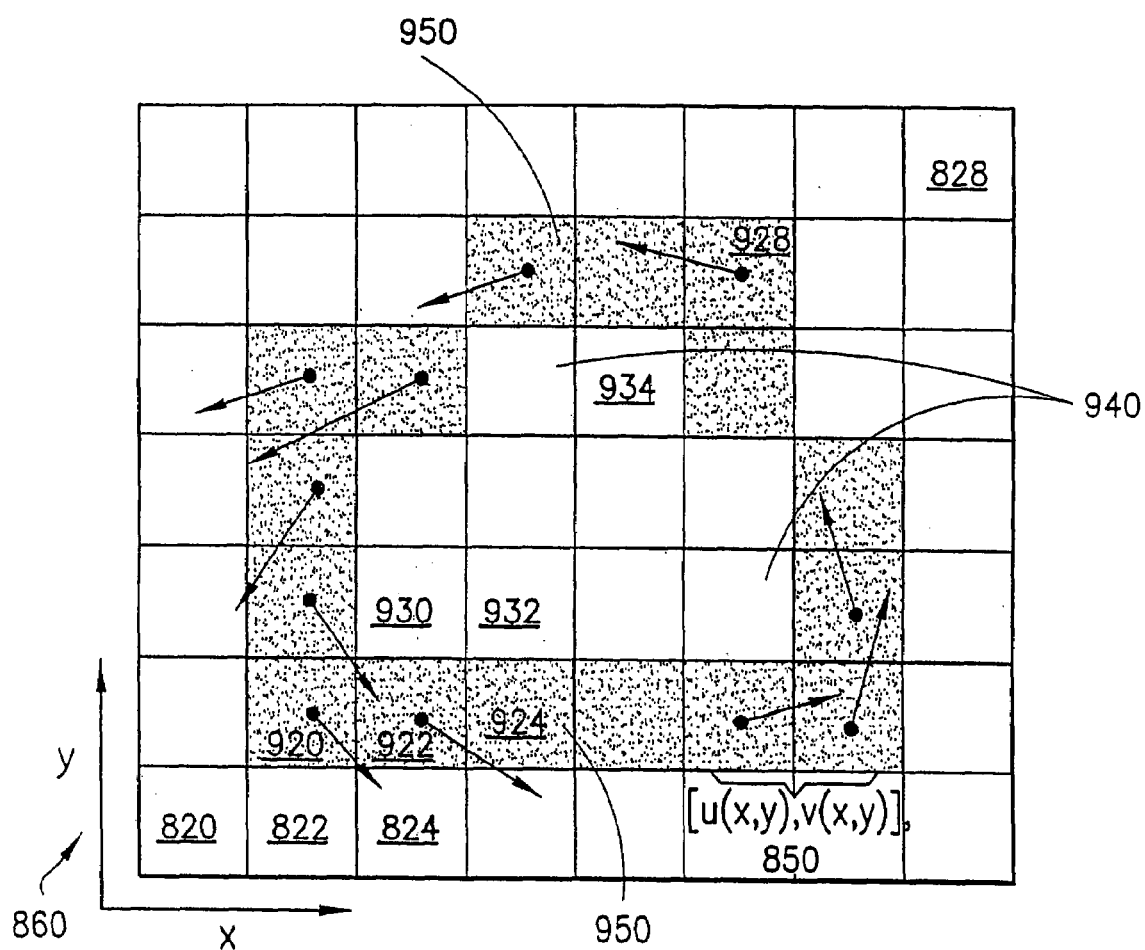
FIG. 9 shows the zero-flow and the nonzero-flow blocks of an image of the sequence.

Rotation from one print image to the next can be estimated using the following steps illustrated in FIG. 8. The images, B(t) and B(t+1), 810 and 815, are divided up into 16×16 blocks 820, 822, 824, . . . , 828 as determined by the MPEG compression standard. Given a fingerprint image sequence B(t), of which two images are shown in FIG. 8, the inter-image flow (u, v) 840 for each block (of size 16×16) 830 present in an image is computed. This represents the motion that may be present in any image B(t) 810 with respect to its immediate next image B(t+1) 815 in the sequence. A flow characterization [u(x,y), v(x,y)] 850 as a function of (x, y) 860 and t 870 of an image sequence is then a uniform image-to-image motion representation amenable for consistent interpretation. This flow 850 for the 16×16 blocks in each image can be computed from the raw motion vectors encoded in the MPEG-1 or MPEG-2 image sequences. If the input is uncompressed, the flow field can be estimated using motion estimation techniques known in the prior art.

The following references describe the state of the prior art in MPEG compression, an example of prior art optical flow estimation in image sequences, and an example of prior art of directly extracting flow from MPEG-compressed image sequences respectively:

B. G. Haskell, A. Puri and A. N. Netravali, Digital Video: An introduction to MPEG-2, Chapman and Hill, 1997.

J. Bergen, P. Anandan, K. Hanna and R. Hingorani, Hierarchical model-based motion estimation, Second European Conference on Computer Vision, pp. 237–252, 1992.

Chitra Dorai and Vikrant Kobla, Extracting Motion Annotations from MPEG-2 Compressed Video for HDTV Content Management Applications, IEEE International Conference on Multimedia Computing and Systems, pp. 673–678, 1999.

Figure 10:
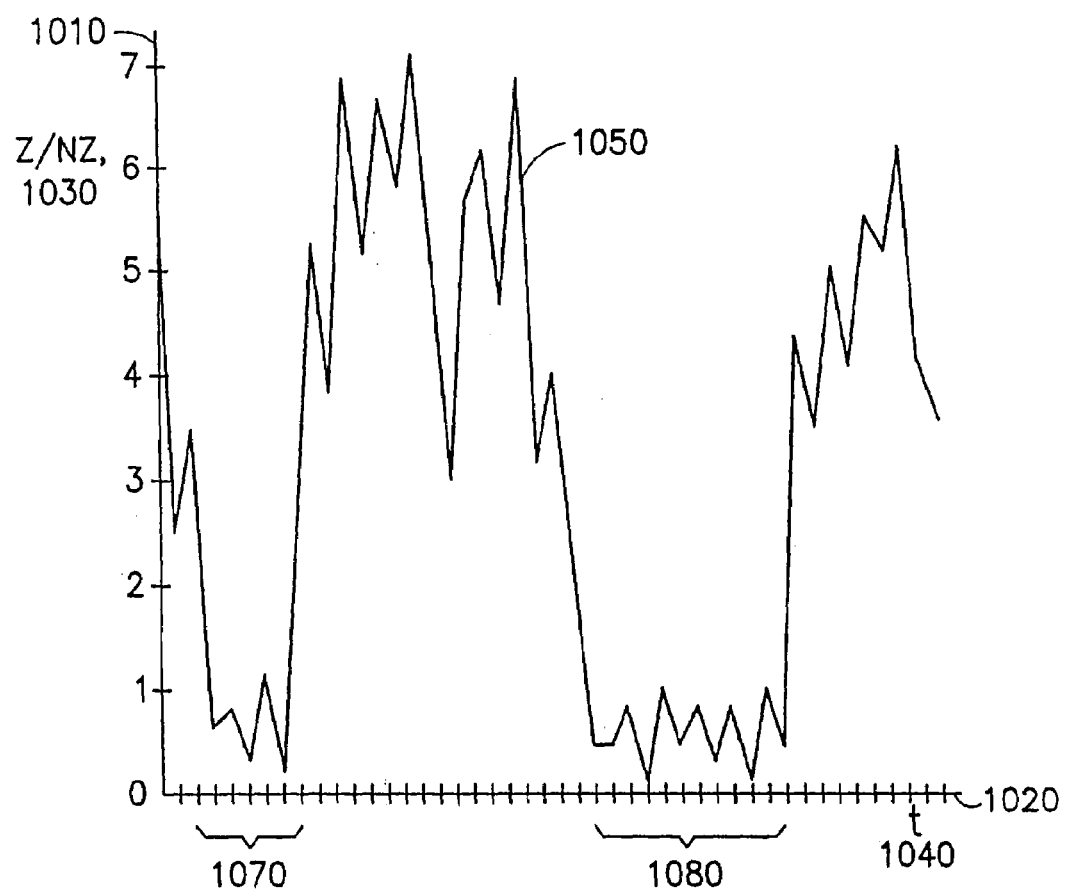
FIG. 10 is a plot of the ratio of zero-flow to nonzero-flow blocks as a function of time.

The process described in FIG. 8 gives the flow of each 16×16 block in each frame in the given sequence of print images. Next, using this flow, those images are selected that exhibit a high level of inter-image flow activity. Referring to FIG. 9, for each individual image, the image is scanned from left-to-right and top-to-bottom. The number Z of zero-flow blocks 820, 822, 824, . . . , 930, 932, . . . , 934, . . . , 828 and the number NZ of non-zero flow blocks 920, 922, 924, . . . , 928 are determined. The ratio Z/NZ then gives a quantitative characterization of the total flow present in the image. During distortion, while a portion of the finger is held stationary, the rest of the finger is twisted, rolled or pressed hard on the scanning surface and this results in a flow field in which there are a few zero-flow blocks corresponding to the stationary part of the finger and a substantial number of surrounding blocks show some non-zero flow. If Z/NZ<1, the number of blocks with non-zero flow exceeds the number of blocks with zero flow. Plotting this ratio as a function of time results in a graph as shown in FIG. 10. The horizontal axis 1020 represents time t 1040 and the vertical axis 1010 represents the ratio Z/NZ 1030. The plot 1050 then indicates time intervals 1070 and 1080 where there exists significant flow from image to image.

For images with Z/NZ>>1, there exist many more blocks without image flow than block with image flow. These images can be used to obtain finger or palm-print images with minimal distortion. If Z/NZ<1 in an image, the image is deemed to be a candidate for detailed distortion analysis.

When the palm or finger is rotated during acquisition, a portion of the finger is typically held stationary and the rest of the print around this pivotal unmoving region is moved to introduce distortion in the print image. In FIG. 9, the pivotal region 940 with blocks 930, 932, . . . , 934 is surrounded by an area 950 of moving blocks 920, 922, 924, . . . , 928. In images where the number of blocks with non-zero flow exceeds the number of blocks with zero flow (referred to as candidate images), connected components of zero-flow blocks are found. (The process of finding connected image components is well-known to those skilled in the art.) In each candidate image, the largest region, measured in area, of zero-flow blocks 940 is selected as the unmoving region which is used in the process to determine rotation of the print.

Figure 11A:
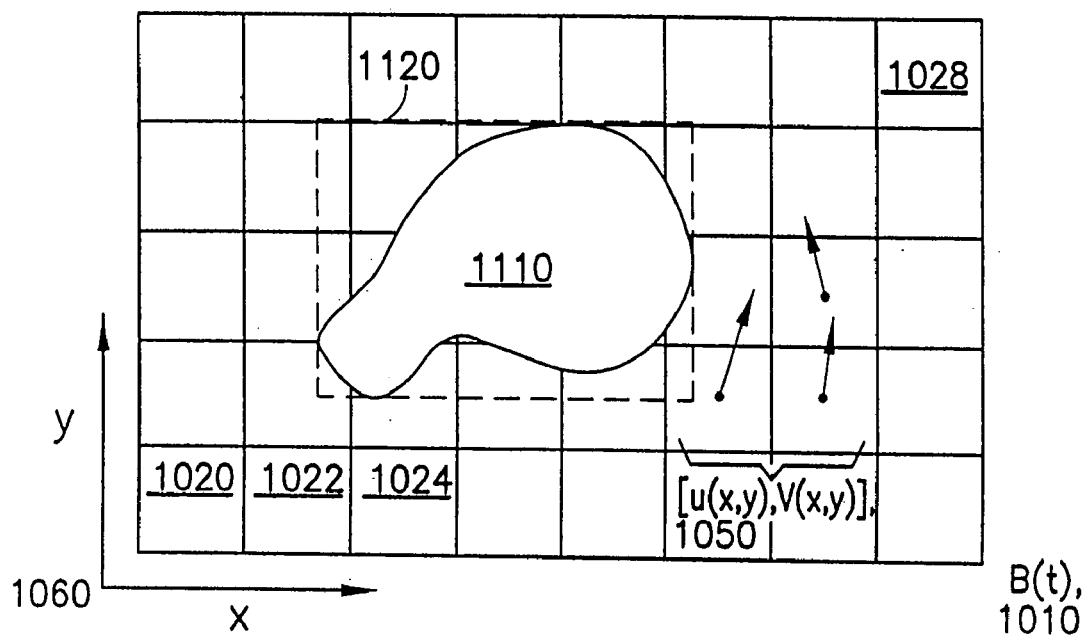
FIG. 11 explains the computation of the curl or the spin of the finger as a function of time, which is the behavioral component of the resultant fingerprint.

Refer now to FIG. 11. By examining the flow [u(x,y), v(x,y)] 850 in the blocks 920, 922, 924, . . . , 928 of FIG. 9, a largest connected component of zero-motion blocks, pictured by pivotal region 1110 in FIG. 11 (940 in FIG. 9) is determined in each candidate image. The rotation estimation process is performed on the flow around this region. Using the flow computed for each image and each block in the given image sequence, motion parameters from the fingerprint region are computed by determining an affine motion model for the consecutive image-to-image flow and sampling the non-zero motion blocks radially around the bounding box 1120 of region 1110. FIG. 12 shows the radial sampling process in detail. Around the bounding box 1120 of the pivotal region 1110, annular regions of moving blocks 1220, 1230 and so on, are selected.

Figure 11B:
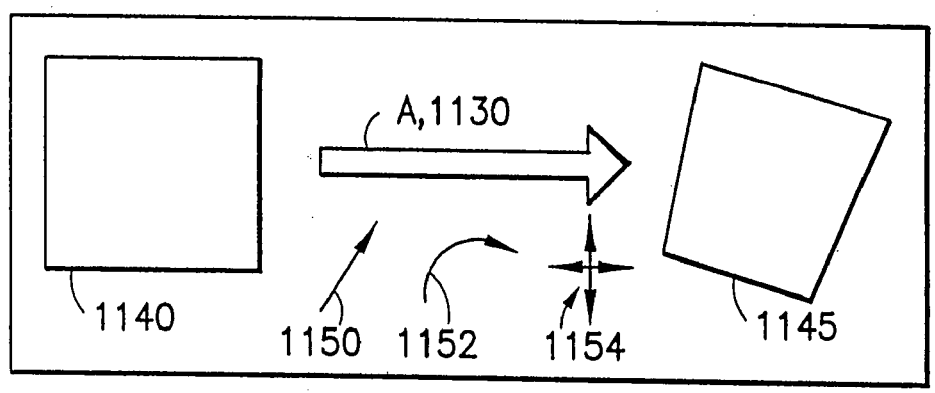
Figure 12:
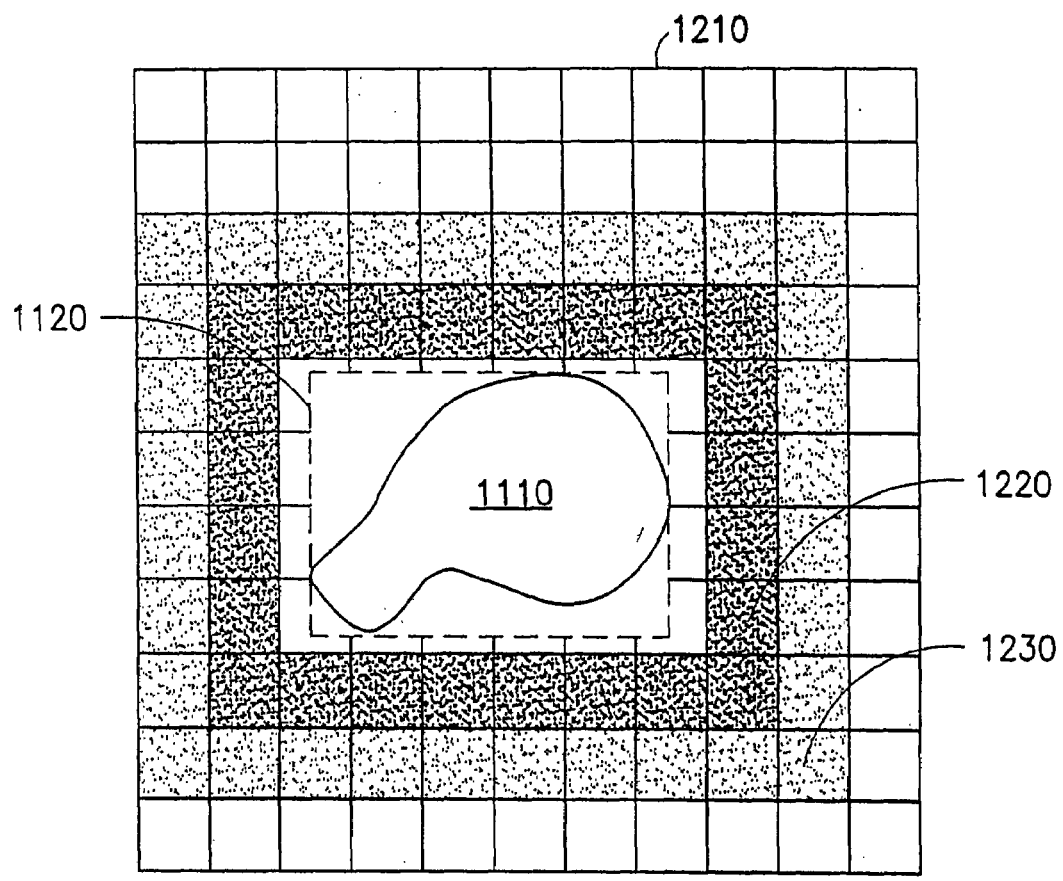
FIG. 12 shows the radial sampling process around the bounding box of a stationary part in a print image.

Affine motion M 1130 can transform shape 1140 into shape 1145 in FIG. 11B and quantifies translation 1150, rotation 1152 and shear 1154 due to image flow. Six parameters, $a_1 \ldots a_6$ are estimated in this process, where $a_1$ and $a_4$ correspond to translation, $a_3$ and $a_5$ correspond to rotation, and $a_2$ and $a_6$ correspond to shear. This transformation (motion) is given by $$u(x,y)=a_1+a_2 x+a_3 y$$

$$u(x,y)=a_4+a_5 x+a_6 y$$

The affine transformation parameters are estimated using all the motion blocks in all annular regions around bounding box 1120 by using the least square error estimation technique described in J. Meng and S.-F. Chang, "CVEPS—a compressed video editing and parsing system," in Proc. ACM 1996 Multimedia Conference, November 1996. This reference is incorporated herein by reference in its entirety.

Average curl is computed in each image t, as $C(t)=-a_3+a_5$. The curl in each image quantitatively provides the extent of rotation, or the spin of the finger or palm skin around the pivotal region. That is, an expression C(t) of the behavioral component of the resultant fingerprint or palm-print computed from flow vectors [u(x,y), v(x,y)] 850 is obtained. The magnitude of the average translation vector, $T(t)=(a_1, a_4)$ of the frame is also computed.

Figure 13:
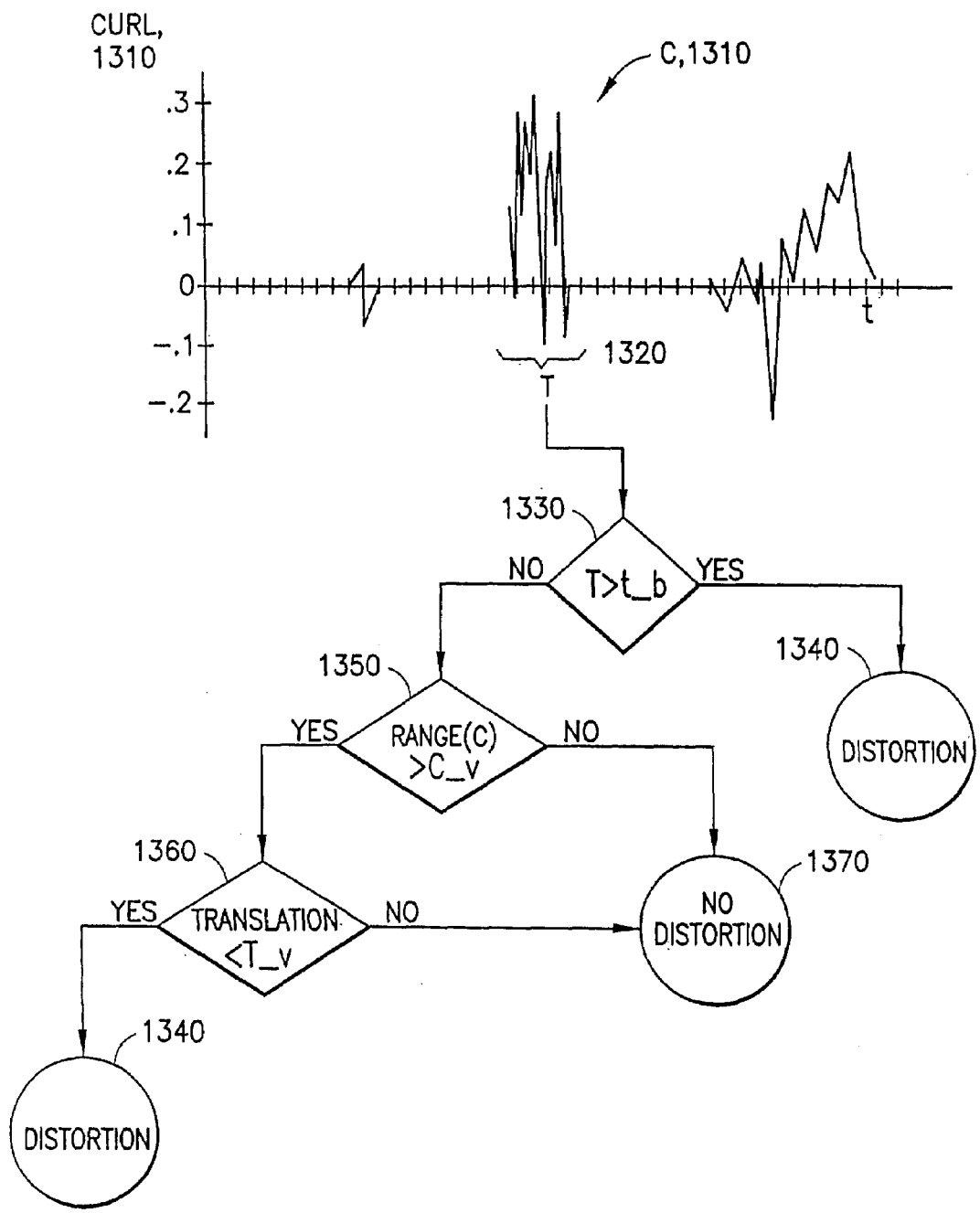
FIG. 13 is a flow diagram of the thresholding classification operation to detect distortion in a print sequence.

A smoothed curl (rotation) C'(t) 1310 in FIG. 13 and translation T'(t) as a functions of time are determined by the computing the average values of curl and translation over a temporal neighborhood. The preferred temporal window is one-tenth of a second, or in other words three consecutive images. Hence, C'(t) is the behavioral rotation component of the resultant palm-print or fingerprint.

To detect where distortion (for example, rotation) occurs in the print sequence and to select undistorted images in a sequence of print images, a simple thresholding-based classification operation is carried out on the sequences of smoothed average values of curl 1310 in FIG. 13 and translation as functions of time for the print sequence. (The process of thresholding is well-known to those skilled in the art.) This operation makes use of the temporal length of the sequence of contiguous candidate images and the range of their curl values as a function of time in its final determination of occurrence of distortion in the sequence. If the temporal length, T of a group of contiguous candidate images 1320 in FIG. 13 exceeds a threshold, t_b 1330 in FIG. 13 (t_b=0.1 seconds in the best embodiment), then it is established that the group cannot be a noisy blip but rather it contains frames that have low Z/NZ ratio and have significant smoothed curl values. Therefore that group 1320 in FIG. 13 is labeled to contain distorted images 1340 in FIG. 13. On the other hand, if the temporal length, T of a group of contiguous candidate images 1320 in FIG. 13 is small (less than t_b), then the classification process investigates more closely to verify whether this small blip is a true distortion event. This is carried out using two sequential tests: (I) the first test 1350 in FIG. 13 checks whether the range of curl values of images in this group exceeds a certain threshold C_v; this establishes that there are abrupt and large changes in the curl values which are indicators of distortion due to quick finger twist. (II) the second test 1360 in FIG. 13 examines whether the maximum translation magnitude in this group of frames 1320 in FIG. 13 is less than a certain threshold T_v; this is to ensure that the group of frames does not undergo pure translation which can only be due to a finger being merely moved around from one point on the scanning surface to another without any twist. Once the group is shown to possess high curl variation and low translation, the classification process labels the group as a true distortion group 1340 in FIG. 13. If the curl variation is low, it is inferred that there is no strong evidence of distortion and the group is marked as an undistorted interval 1370 in FIG. 13. Affine parameters of the selected distorted images 1340 in FIG. 13 characterize the finger movements in these images leading to distortion. At the end of the thresholding-based classification operation, each image in the print sequence has one of two labels, distortion and no-distortion. A merging process is then carried out to group consecutive time intervals of identical distortion or no-distortion labels to form cohesive distorted or undistorted sub sequences in the print sequence respectively. Images can be selected from the undistorted sub sequences within the sequence of print images to match with stored templates.

For the resultant prints discussed, we have a traditional behavioral or physiological biometric. For representation (template) purposes and for matching purposes of that part of resultant biometrics, these traditional biometrics are well understood in the prior art. (See, the above Ratha, Chen and Jain reference for fingerprints.) For the other part of the resultant prints, the behavioral part, we are left with some one-dimensional rotation C'(t) of time, the user action. Matching this part amounts to matching this function C'(t) with a stored template S(t). Such matching is again well-understood in the prior art and is routinely done in the area of signature verification. The following reference gives examples of approaches for matching.

V. S. Nalwa, "Automatic on-line signature verification," Proceedings of IEEE, pp. 215–239, February 1997. This reference is incorporated herein by reference in its entirety.

Now the resultant print, after matching with a stored template has either two 'Yes/No' (214 in FIG. 3) answers or two scores $S_1$ and $S_2$ (231 and 233 in FIG. 3). Any of the methods for combining the two biometrics discussed in FIG. 3 can be used to combine the traditional and user-defined biometrics of a resultant biometric to arrive at a matching decision.

We claim:

1. A biometrics system comprising:
    an acquisition device for acquiring and storing a sequence of discrete print images from a part of a hand moving during a time period;
    a trajectory process that determines the position and orientation of the images of said part of the hand as a function of time during the time period; and
    an estimator process that determines a distortion of the discrete print images as a function of time due to the change in position and orientation, wherein the estimator process determines distortion by determining at least a motion of an image pattern occurring in one or more blocks of at least two of the discrete print images.

2. A system, as in claim 1, where the part of the hand includes one or more of the following: a fingerprint and a palm-print.

3. A system, as in claim 1, where the distortion is caused by one or more of the following: rotation, translation, and shear.

4. A system, as in claim 1, where the motion is interframe motion and where the estimator process comprises the steps of:
    determining one or more blocks of interframe motion between consecutive pairs of the images in the sequence;
    determining a proportion of blocks with no motion to blocks with some motion;
    using the proportion to select a set of candidate distorted images;
    identifying a largest stationary and spatially contiguous block in each candidate distorted image in the set;
    estimating a global affine transformation between every pair of candidate distorted images in the set about the stationary and contiguous block;
    determining a curl and translation from the global affine transformation between every pair of candidate distorted images in the set; and
    using the change of the curl over the time period to indicate the distortion.

5. A system, as in claim 4, where, when the change in curl over the time period is greater than a threshold, the distortion is caused by one or more of the following: rotation, translation, and shear.

6. A system, as in claim 4, where the distortion is primarily translation when curl is within a second threshold of zero and the translation exceeds a third threshold.

7. A method for detecting the distortion of a fingerprint or palm-print, comprising the steps of:
    acquiring and storing a sequence of discrete print images from a part of a hand moving during a time period;
    determining the position and orientation of the images of said part of the hand as a function of time during the time period; and
    determining a distortion of the discrete print images as a function of time due to the change in position and orientation, wherein the step of determining a distortion further comprises the step of determining at least a motion of an image pattern occurring in one or more blocks of at least two of the discrete print images.

8. The method of claim 7, where the part of the hand includes one or more of the following: a fingerprint and a palm-print.

9. The method of claim 7, where the distortion is caused by one or more of the following: rotation, translation, and shear.

10. A method for determining a distortion of a set of images as a function of time due to the change in position and orientation of a hand comprising the steps of:
    determining one or more blocks of interframe motion between consecutive pairs of images in a sequence of images from a part of a hand moving during a time period;
    determining a proportion of blocks with no motion to blocks with some motion;
    using the proportion to select a set of candidate distorted images;
    identifying a largest stationary and spatially contiguous block in each candidate distorted image in the set;
    estimating a global affine transformation between every pair of candidate distorted images in the set about the stationary and contiguous block;
    determining a curl and translation from the global affine transformation between every pair of candidate distorted images in the set; and
    using the change of the curl over the time period to indicate the distortion.

11. The method of claim 10, where, when the change in curl over the time period is greater than a threshold, the distortion is caused by one or more of the following: pure rotation, translation, and shear.

12. The method of claim 10, where the distortion is primarily translation when curl is within a second threshold of zero and the translation exceeds a third threshold.

13. A biometrics system comprising:
    an acquisition device for acquiring and storing a sequence of discrete images from a part of a hand moving during a time period;
    a trajectory process that determines the position and orientation of the images of said part of the hand as a function of time during the time period;
    an estimator process that determines a distortion of the discrete images as a function of time due to the change in position and orientation, wherein the estimator process determines distortion by determining at least a motion of an image pattern occurring in one or more blocks of at least two of the discrete print images; and identifying a person utilizing at least said determined distortion.

14. A biometrics system comprising:

an acquisition device for acquiring and storing a sequence of discrete images from a part of a hand moving during a time period;

a trajectory process that determines the position and orientation of the images of said part of the hand as a function of time during the time period;

an estimator process that determines a distortion of the discrete images as a function of time due to the change in position and orientation, wherein the estimator process determines distortion by determining at least a motion of an image pattern occurring in one or more blocks of at least two of the discrete print images; and authenticating a person utilizing at least said determined distortion.

* * * * *